M. MOHR.
COMBINED BUSHING AND PIVOT.
APPLICATION FILED JULY 24, 1917.
1,317,808.
Patented Oct. 7, 1919.
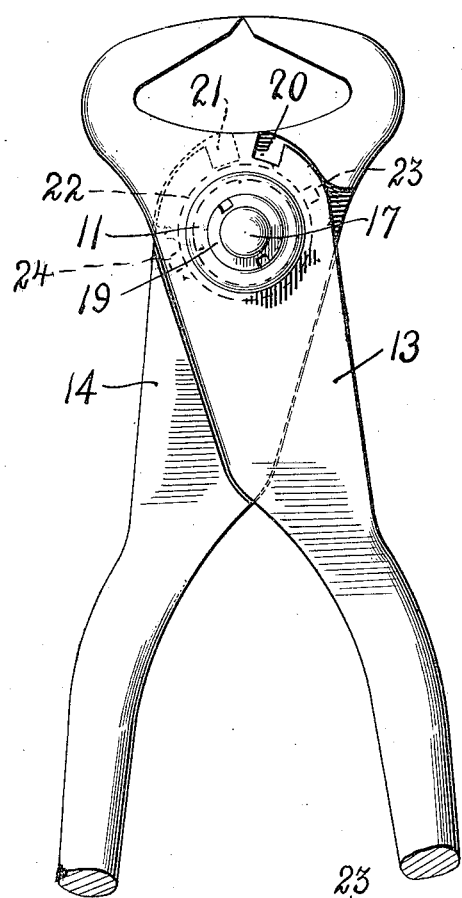
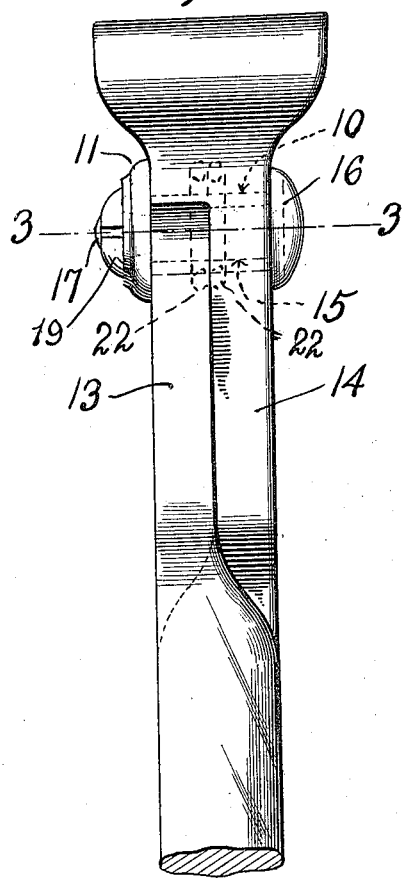
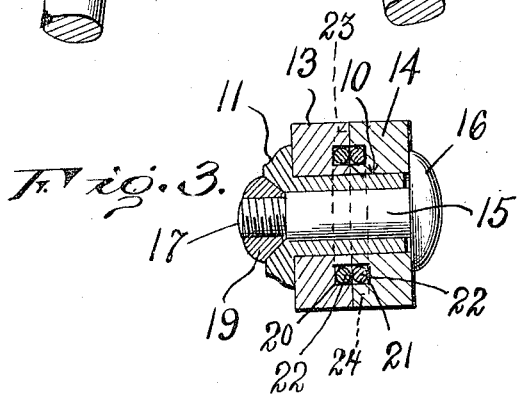
Inventor
M. Mohr.
By
Attorneys.

UNITED STATES PATENT OFFICE.

MICHEL MOHR, OF EDMONTON, ALBERTA, CANADA, ASSIGNOR OF ONE-HALF TO ALBERT B. KALES, OF EDMONTON, ALBERTA, CANADA.

COMBINED BUSHING AND PIVOT.

1,317,808.   Specification of Letters Patent.   Patented Oct. 7, 1919.

Application filed July 24, 1917. Serial No. 182,550.

*To all whom it may concern:*

Be it known that I, MICHEL MOHR, a subject of the King of Great Britain, residing at Edmonton, in the Province of Alberta and Dominion of Canada, have invented certain new and useful Improvements in Combined Bushings and Pivots, of which the following is a specification.

This invention relates to improvements in combined bushing and clamping bolts, and has for one of its objects to simplify the construction and to decrease the wear and friction between the parts.

With these and other objects in view, the invention consists in certain novel features of construction, as hereinafter shown and described and then specifically pointed out in the claims.

The improved implement is designed more particularly for use in uniting the combined handle and jaw portions of pincers, tongs and like implements, and for the purpose of illustration is shown applied to an implement of this character, and in the drawings thus employed—

Figure 1 is a side elevation of portions of a pair of pincers or tongs with the improvement applied;

Fig. 2 is an edge view of the parts shown in Fig. 1;

Fig. 3 is a section on the line 3—3 of Fig. 2.

The improved device comprises a tubular member 10 having a laterally enlarged head 11 at one end and designed to extend through registering apertures in the stock 13—14 of a pair of tongs or pincers. Extending through the tubular member 10 is a bolt or pin 15 having a laterally enlarged head 16 at the end opposite to the head 11. The members 11—16 bear upon the outer faces of the adjacent portions of the members 13—14. The bolt 15 is reduced at the end opposite to the enlarged end 16 as shown at 17, and the bore of the tubular member at the enlarged head 11 is flared or tapered to receive a conical nut 19, the taper of the nut corresponding to the taper or flared portion of the bore of the tubular member, as shown in Fig. 3. The nut and the head 16 are provided with screw driver cavities to enable them to be actuated. By this means the parts 13—14 may be firmly and pivotally united and the friction between them effectually controlled. The confronting faces of the members 13—14 are formed with annular seats 20—21 surrounding the apertures for the tubular member 10 to receive a coiled spring 22, one terminal of the spring being directed laterally as indicated at 23, to enter a corresponding lateral cavity in one of the stock members and the other terminal directed laterally as indicated at 24 to enter a corresponding lateral cavity in the other stock member. The spring thus operates to hold the jaws of the pincers normally yieldably extended or open. The length of the tubular member 10 is slightly less than the combined thickness of the stock members 13—14 so as to produce a space or clearance between the end of said tubular member and the head 16 of the bolt and thus permit said stock members to be firmly clamped between the heads of said tubular member and bolt when the latter is adjusted.

By this simple arrangement, the material of the united members 13—14 is protected from wear, while at the same time friction between the parts is reduced to a minimum.

Having thus described the invention, what is claimed as new is:

1. A device of the class described comprising a tubular bushing enlarged laterally at one end to form a head and adapted to engage through coacting members with said head bearing flat against the outer face of one of the members and with the end of the tubular bushing spaced inwardly from the outer face of the other member, the bore of the bushing being flared at its head end, a bolt threaded at one end and extending through said tubular bushing and laterally enlarged at the other end, said bolt enlargement being adapted to bear flat against the outer face of the second mentioned coacting member, and a tapered nut engaging the threads of the bolt and fitting into the flaring portion of the bore.

2. A device of the class described comprising a tubular bushing adapted to extend through coacting members and enlarged laterally at one end to form a head the inner face of which is disposed at substantially right angles to the axis of said bushing to form a shoulder bearing flat against the outer face of one of the coacting members, the end of the tubular bushing being spaced inwardly from the outer face of the other coacting member, and the bore of said tubular member being flared at its head end, a bolt threaded at one end and extending through said bushing and laterally enlarged at the other end to form a shoulder, the shoulder on the enlarged end of the bolt being adapted to bear flat against the outer face of the second mentioned coacting member, and a tapered nut engaging the threads of the bolt and fitting into the flaring portion of the bore.

In testimony whereof I affix my signature.

MICHEL MOHR. [L. S.]

Copies of this patent may be obtained for five cents each, by addressing the "Commissioner of Patents, Washington, D. C."